United States Patent
Zheng

(10) Patent No.: US 11,516,100 B1
(45) Date of Patent: Nov. 29, 2022

(54) CLOUD-TO-CLOUD INTEGRATION OF VENDOR DEVICE TESTING AUTOMATION AND CARRIER PERFORMANCE ANALYTICS

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/343,189

(22) Filed: Jun. 9, 2021

(51) Int. Cl.

| | |
|---|---|
| *H04B 17/18* | (2015.01) |
| *H04L 43/08* | (2022.01) |
| *H04L 67/10* | (2022.01) |
| *H04L 67/02* | (2022.01) |
| *G06F 16/22* | (2019.01) |
| *H04L 43/028* | (2022.01) |
| *G06F 9/54* | (2006.01) |
| *H04L 43/50* | (2022.01) |

(52) U.S. Cl.
CPC .............. *H04L 43/08* (2013.01); *G06F 9/547* (2013.01); *G06F 16/22* (2019.01); *H04L 43/028* (2013.01); *H04L 43/50* (2013.01); *H04L 67/02* (2013.01); *H04L 67/10* (2013.01)

(58) Field of Classification Search
CPC ..... H04L 41/14; H04L 41/5009; H04L 67/02; H04L 67/10; H04W 24/08; H04W 24/02; H04B 17/16; H04B 17/18; G06F 9/547; H04l 67/02; H04l 67/10
See application file for complete search history.

(56) References Cited

U.S. PATENT DOCUMENTS

| | | | |
|---|---|---|---|
| 10,374,882 B2* | 8/2019 | Sheen | H04L 41/0816 |
| 2006/0235778 A1* | 10/2006 | Razvi | G06Q 10/10 |
| | | | 705/35 |
| 2015/0141149 A1* | 5/2015 | Thomas | A63F 13/30 |
| | | | 463/42 |
| 2015/0288465 A1* | 10/2015 | Ouyang | H04B 17/18 |
| | | | 455/67.11 |
| 2016/0173211 A1* | 6/2016 | Ouyang | H04B 17/16 |
| | | | 455/425 |
| 2018/0270126 A1* | 9/2018 | Tapia | H04L 41/5009 |
| 2021/0090556 A1* | 3/2021 | Quemy | G06Q 10/1097 |

* cited by examiner

*Primary Examiner* — Chirag R Patel
(74) *Attorney, Agent, or Firm* — Lee & Hayes, P.C.

(57) ABSTRACT

A processor-implemented method includes integrating telecommunication network provider performance analytics with vendor testing automation such that specific data from vendor user equipment (UE) testing can be filtered out and the performance data results represent true service performance for the desired UEs. A network device associated with the network provider may establish an application programming interface (API) with a vendor device associated with the vendor to receive vendor testing information used to identify UEs undergoing vendor testing. The network device may identify the vendor UEs undergoing vendor testing when performing measurements on a group of UEs, such as key performance indicator (KPI) measurements.

20 Claims, 6 Drawing Sheets

CLOUD-TO-CLOUD INTEGRATION OF VENDOR DEVICE TESTING AUTOMATION AND CARRIER PERFORMANCE ANALYTICS

BACKGROUND

Telecommunication network providers may perform tests on new devices and/or technology prior to being released to the public. Vendors, such as original equipment manufacturers (OEMs), that manufacture the devices and/or the technology may also perform tests after the devices and/or technology has been manufactured and provided to the telecommunication network provider. During measurements being performed by the telecommunication network provider, it is often difficult to identify devices being tested by the OEM and the measurement results associated with those devices may be over-indexed by the telecommunication network provider.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
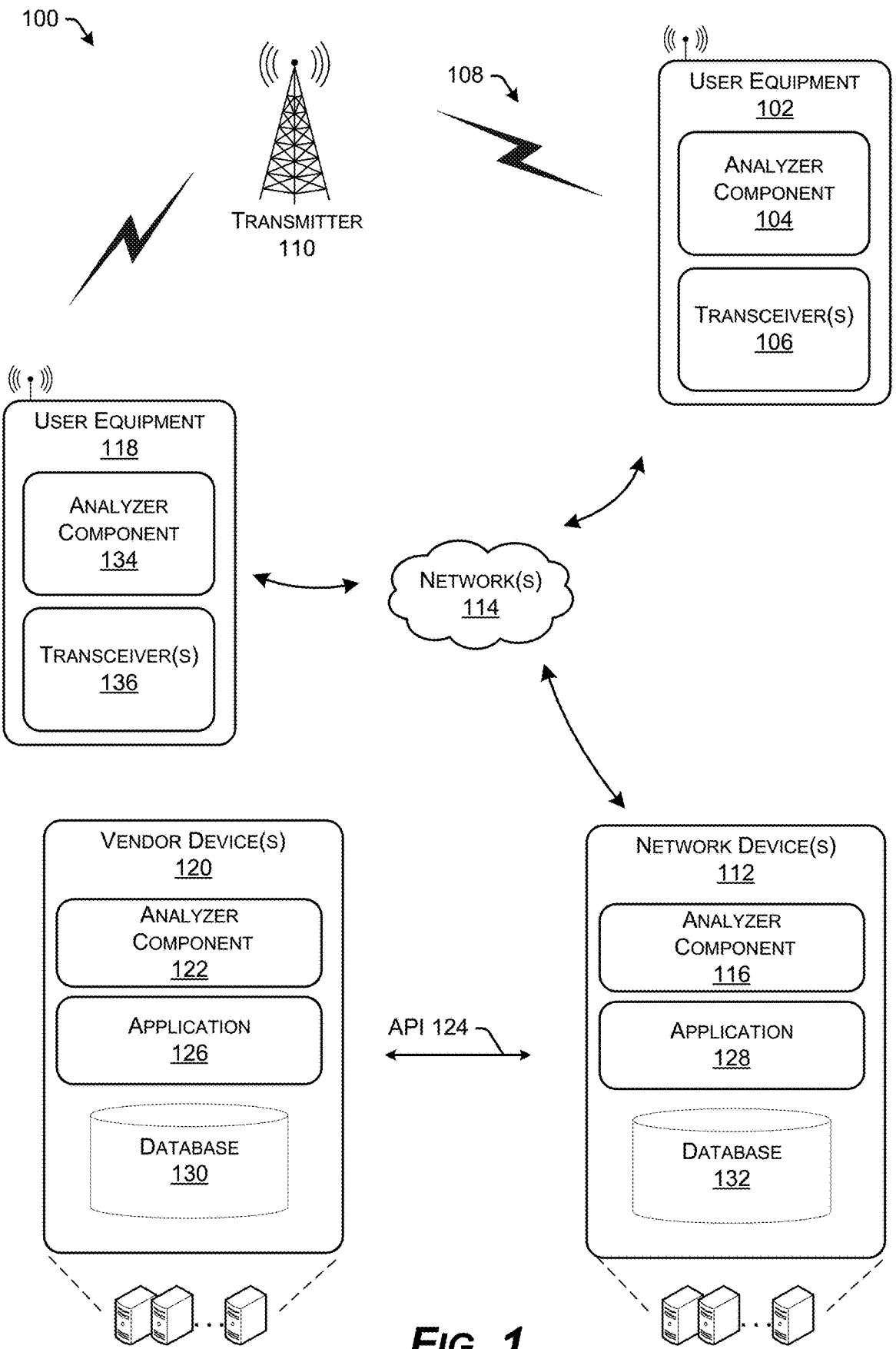
FIG. 1 illustrates an example environment including a network device including an analyzer component to facilitate collection of network metrics, as described herein.

Systems, devices, and methods are directed to integrating telecommunication network provider (referred to herein as "network provider") performance analytics with vendor (e.g., OEM) testing automation such that specific data from vendor user equipment (UE) testing can be filtered out (e.g., removed) and, therefore, the performance data results represent true service performance for the desired UEs.

In some cases, a network provider may measure quality key-performance-indicators (KPIs) to understand pre-launch technology and service experience to make go-no-go decisions. KPIs commonly used are call drops, network access failures, data throughput, latency, voice quality, etc. The measured data (e.g., KPIs) may be collected from test UEs provided to users by the network provider as well as vendor UEs that are also connected to a network being provided by the network provider. The vendors may be running tests on their own UEs and/or be developing variations on software that report a same version number to the network provider as those UEs provided to users by the network provider. The vendor tests are often stress tests (e.g., intensive drive tests) that measure upper-bound limits of the UE capabilities. Thus, when the network provider is measuring KPI performance for UEs and/or software versions, the data collected from vendor UEs may not represent an accurate view of the performance of the UE and/or software to be approved.

In some examples the network provider may provide a cloud-based application programming interface (API) to the vendor(s) to receive vendor testing information (e.g., identifying information). The API may be in the form of a JSON object such that the vendor can call HTTP POST and HTTP GET to send and receive data.

In some cases, the network provider may receive vendor testing information (e.g., identifying information) associated with the devices that the vendor is performing tests on. For example, the vendors may provide the network provider, via the API, with device models, software versions, IMEIs, MSISDNs, phone numbers, type of testing (e.g., intensive drive tests), testing schedules, etc.

In some examples, the network provider may store the vendor testing information in a database. For example, the network provider may store a database containing identifying information for all of the network UEs provided to the consumers undergoing testing as well as identifying information of the vendor UEs received from the vendors undergoing vendor testing. In some cases, the database is accessible by the vendors via the API and the vendors can receive and send information, for example, via an HTTP POST or HTTP GET.

In some examples, the network provider may perform a measurement of KPIs for a particular UE (e.g., make, model, brand, etc.) and/or a particular technology (e.g., software version, software update, etc.) and the network provider may receive first KPI data associated with a group of UEs undergoing testing. In some cases, prior to performing the measurement (e.g., prior to sending a request to the UEs for KPI data), the network provider may reference the database to determine which UEs and/or technology are undergoing vendor testing and the network provider may refrain from performing the measurement on those UEs.

In other cases, the network provider may perform a measurement on all of the UEs to be tested within a given area and receive KPI data for those devices. Once the KPI data is received, the network provider may reference the database and determine which UEs and/or technology are undergoing vendor testing and the network provider may remove KPI data received from those UEs out of the collected KPI data received from the measured UEs.

In this way, the network provider may utilize cloud-based APIs to filter out measured data received from UEs undergoing vendor testing and as a result, generate an accurate measurement of UEs and/or technology being utilized by a typical consumer.

In some cases, the network provider may utilize the APIs to communicate to the vendor when certain UEs and/or technology are performing below a threshold level. For example, the network provider may perform a measurement of KPIs on a group of UEs and/or technology that was previously provided to the network provider by the vendor. The network provider may determine that one or more of the measured KPIs falls below and/or above a threshold (e.g., a particular UE and/or service has a drop call rate above a threshold and/or a difference between the drop call rate of the vendor device compared to a determined average may be above a threshold).

In some examples, the network provider may send an indication to the vendor via the API that the measured KPI value is below and/or above the threshold value. In other cases, the measured KPI value may be stored in the database and the vendor may be automatically informed of the KPI value being below and/or above the threshold value. For example, a webhook service may be built into the API such that network provider posted performance KPI values (e.g., drop call rate above a threshold value) may be saved to a database resulting in the webhook being triggered such that the information is informed to the vendor.

In some cases, the network provider may perform measurements on multiple UEs/software each day and may need to communicate with multiple vendors (e.g., 50 vendors) per UE/software. A particular benefit to using the cloud-based API is its lightweight data exchange. Using a lightweight communication system with the vendors as well as filtering out potential outliers while measuring KPIs reduces stress on a network and improves performance of the overall network.

The systems, devices, and techniques described herein can be implemented in a number of ways. Example implementations are provided below with reference to the following figures.

FIG. 1 illustrates an example environment 100 including network device of a network provider to facilitate mobile collection of UE KPIs, as described herein.

In some instances, a UE 102 can include an analyzer component 104 and one or more transceiver(s) 106. In general, the UE 102 can receive a signal 108 output by a transmitter 110 to determine one or more metrics associated with the signal 108. In some instances, the UE 102 can receive the signal 108 and analyze the signal 108, as discussed herein, independent of conducting any communications via the signal 108 and/or the transmitter 110. In some instances, the transmitter 110 can represent any one-directional or two-directional wireless communication transceiver.

In some instances, the one or more transceiver(s) 106 can receive the signal 108 at the UE 102, and the analyzer component 104 can determine various metrics associated with the signal 108. For example, the one or more metrics can include, but are not limited to, one or more of a received signal strength indication (RSSI), a reference signal received power (RSRP), a reference signal received quality (RSRQ), and a signal-to-interference-plus-noise ratio (SINR). For example, the metrics may include one or more values indicative of RSRP. Further, the metrics can include a channel identifier (e.g., channel 1, 2, . . . , N (where N is an integer)) and/or an indication of a frequency associated with a channel (e.g., 617-622 MHz, 622-627 MHz, 627-632 MHz, . . . , 647-652 MHz). In some instances, the metrics can include a number of channels associated with a particular frequency band. In some instances, the metrics can be determined independently for a channel or for a block of frequencies.

In some instances, based at least in part on metrics, the UE 102 and/or a network device can determine characteristics of the signal 108, such as whether the signal is a television signal or a signal for wireless communication (e.g., to exchange (bidirectional) voice and/or data). In some instances, the metrics can include one or more roaming network indicators including one or more MCCs, one or more MNCs, etc. RSRP, often measured in decibel-milliwatts (dBm), is the average power of Resource Elements (RE) that carry cell specific Reference Signals (RS) over the entire bandwidth, so RSRP is only measured in the symbols carrying RS. The average power received from a single RS is often quantified in terms of signal ranges. In some instances, the UE 102 can receive a plurality of signals, for example, by tuning one or more filters associated with the transceiver(s) 106, to isolate a specific frequency of a signal. In some instances, the UE 102 may measure a plurality of MCC and/or MNC values, and evaluate whether the home network signal is relatively weak based on the measured values. In one aspect, the system may determine that a signal is weak based on multiple measurements of other signals sharing similar characteristics as the subject signal, without measuring the subject signal. For example, the system may identify a plurality of weak signals that share one or more similar characteristics (e.g., geographic region, connectivity with a particular tower or cell, etc.) as the subject signal when the subject signal is not measurable. The subject signal may be unavailable for measurement for various reasons, such as, for example, the signal is so weak that it may not be measurable, or the user equipment may not be able to connect with the network for another reason. In some instances, the system may measure MCC/MNC in the similar signals, and identify multiple signals having relatively weak MCC/MNC. In some aspects, even if the subject signal is unavailable for direct measurement, the presence of other similarly situated signals with relatively weak MCC and/or MNC values could be indicative of packet loss and/or other signal reliability issues associated with the subject signal. Other techniques can be used to configure the UE 102 to receive a range of frequencies.

The UE 102 can communicate with one or more network device(s) 112 via one or more network(s) 114. For example, the transceiver(s) 106 of the UE 102 may transmit one or more metrics to the one or more network device(s) 112, where the metrics include KPI information.

FIG. 1 illustrates the UE 102 capturing metrics associated with the transmitter 110, as described herein. In some instances, the UE 102 can receive the signal 108 output by the transmitter 110 and can determine the metrics associated with the signal 108. The metrics associated with the signal 108 can include information indicative of signal strength of the signal 108 as it is received at the UE 102, location of the UE 102, and other information. For example, the metrics discussed in FIG. 1 may include RSSI, RSRP, MCC, MNC, a network type, global positioning system (GPS) information, and other information. The metrics, and particularly, the example information included in the metrics as discussed herein, are only examples and not meant to be limiting.

In some instances, the network device(s) 112 can include an analyzer component 116 that can receive the one or more metrics from the UE 102, as well as other user equipment, and aggregate the metrics to generate determined PKI values for a group of UEs and/or technology associated with the group of UEs.

In some cases, the analyzer component 116 of the network device 112 may measure quality key-performance-indicators (KPIs) to understand pre-launch technology and service experience to make go-no-go decisions. KPIs may include, but are not limited to, call drops, network access failures, data throughput, latency, voice quality, etc. The measured data (e.g., KPIs) may be collected from test UEs, such as the UE 102, provided to users by a network provider associated with the network device 112, as well as vendor UEs, such as a UE 118, that are also connected to the network 114 being provided by the network provider. The vendors may be associated with a vendor device 120 having an analyzer component 122 that may be running tests on their own UEs, such as UE 118, and/or be developing variations on software that report a same version number to the network device 112 as those UEs, such as UE 102, provided to users by the network provider. The vendor tests are often stress tests (e.g., intensive drive tests) that measure upper-bound limits of the UE 118 capabilities. Thus, when the network device 112 is measuring KPI performance for UEs and/or software versions, the data collected from the UE 118 may not represent an accurate view of performance.

In some examples the network device 112 may provide an API 124 (e.g., a cloud-based API) to the vendor device 120 to receive vendor testing information (e.g., identifying information). In some examples, the API 124 may be in the form of a JSON object such that the vendor device 120 can call HTTP POST and HTTP GET to send and receive data to and from the network device 112. In some cases, the vendor device 120 and the network device 112 may communicate via the API 124 using an application 126 stored on the vendor device 120 and an application 128 stored on the network device 112.

In some cases, the network device 112 may receive vendor testing information (e.g., identifying information) associated with the UE 118 that the vendor device 120 is performing tests on. For example, the vendor device 120 may provide the network device 112, via the API 124, with device models, software versions, IMEIs, MSISDNs, phone numbers, type of testing (e.g., intensive drive tests), testing schedules, etc. In some examples, the vendor device 120 may store the identifying information in a database 130 and the application 126 may access the database 130 to send and receive data to and from the database 130 of the vendor device 120.

In some examples, the network device 112 may store the vendor testing information in a database 132. For example, the network device 112 may store the database 132 containing identifying information for all of the network UEs, such as the UE 102, provided to the consumers undergoing testing as well as identifying information of the vendor UEs, such as the UE 118, received from the vendor device 120 undergoing vendor testing. In some cases, the database 132 is accessible by the vendor device 120 via the API 124 and the vendor device 120 can receive and send information, for example, via an HTTP POST or HTTP GET. In some cases, the vendor testing information may provide identifying information associated with the UE 118, testing type information associated with the UE 118, and/or a testing schedule associated with the UE 118.

In some examples, the network device 112 may perform a measurement, via the analyzer component 116, of KPIs for a particular UE type (e.g., make, model, brand, etc.) and/or a particular technology (e.g., software version, software update, etc.) and the network device 112 may receive first KPI data associated with a group of UEs undergoing testing. In some cases, prior to performing the measurement (e.g., prior to sending a request to the UEs for KPI data), the network device 112 may reference the database 132 to determine that the UE 118 is undergoing vendor testing by the vendor device 120 and the network device 112 may refrain from performing the measurement on the UE 118 while continuing to perform measurements on UE 102.

In other cases, the network device 112 may perform a measurement on all of the UEs to be tested within a given area (e.g., both the UE 102 and the UE 118) and receive KPI data for those devices. Once the KPI data is received, the network device 112 may reference the database 132 and determine which UEs and/or technology are undergoing vendor testing and the network device 112 may remove KPI data received from those UEs out of the collected KPI data received from the measured UEs. For example, the network device 112 may receive KPI data from the UE 102 (e.g., via the analyzer component 104 and transceiver 106) and may also receive KPI data from the UE 118 (e.g., via an analyzer component 134 and a transceiver 136). The network device 112 may access the database 132 and determine that the UE 118 is undergoing vendor testing based on identifying information stored in the database that identifies the UE 118 and an indication in the database 132 that the UE 118 is undergoing vendor testing (e.g., a testing schedule, a testing type, etc.). In response to determining that the UE 118 is undergoing vendor testing, the network device 112 may filter the KPI data received from the UE 118 out of the KPI data received from other UEs, such as UE 102.

In some cases, the network device 112 may utilize the API 124 to communicate to the vendor device 120 when certain UEs and/or technology are performing below a threshold level. For example, the UE 102 and/or technology (e.g., software) operating on the UE 102 may have been manufactured by the vendor associated with the vendor device 120 and provided to the network provider associated with the network device 112. The network device 112 perform KPI measurements on the UE 102 and in some cases may determine that one or more of the measured KPIs falls below and/or above a threshold. For example, the network device 112 may determine that a drop call rate associated with the UE 102 is above a threshold and/or a difference between the drop call rate of the UE 102 compared to a determined average may be above a threshold.

In some examples, the network device 112 may send an indication to the vendor device 120 via the API 124 that the measured KPI value is below and/or above the threshold value. In other cases, the network device 112 may store the measured KPI value in the database 132 and the vendor device 120 may be automatically informed of the KPI value being below and/or above the threshold value. For example, a webhook service may be built into (e.g., embedded) the API 124 and/or the database 132 such that when the network device 112 stores performance KPI values (e.g., drop call rate above a threshold value) to the database 132, the webhook may trigger such that the information is transmitted to the vendor device 120. In this way, the vendor associated with the vendor device 120 may be informed that a UE that they manufactured and provided to the network provider associated with the network device 112 is performing inadequately.

In some examples, the network device 112 may receive identifying information from the UE 118 and the UE 102 and compare the identifying information to data stored in the database 132. For example, the data stored in the database 132 may include the identifying information (e.g., device model, a software version, an IMEI, an MSISDN, a phone number, etc.) received from the vendor device 120 via the API 124 that identifies the UE 118 as a device undergoing vendor testing (e.g., stress-testing). The network device 112 may determine that the identifying information received from the UE 118 is stored in the database 132 and indicated to be a UE undergoing vendor testing. Once the network device 112 determines that the UE 118 is undergoing vendor testing, the network device 112 may remove KPI values measured from the UE 118 and/or KPI values received from the UE 118 from the collected KPI data of the UEs that were measured. In some cases, the network device 112 may determine that the UE 118 is undergoing vendor device testing prior to performing any measurements and may refrain from collecting KPI values from the UE 118 after determining that the UE 118 is undergoing vendor device testing.

In some examples, the network device 112 may receive location data from the vendor device 120 via the API 124 indicating an area in which the vendor device 120 is performing vendor testing on a UE, such as the UE 118, or a group of UEs. In some cases, the location data may include a type of testing and/or or a testing schedule indicating which tests (e.g., drive tests, stress tests, upper limit tests, software test, etc.) are being performed at which date and/or time. In some cases the network device may store the location data, the type of testing data, and/or the testing schedule data in the database 132 and may reference the database 132 to determine which UEs are undergoing vendor testing. For example, the network device 112 may perform KPI value measurements for UEs within a predetermined area. In some cases, the network device 112 may access the database 132 to determine if the predetermined area corresponds to location data received from the vendor device 120 and determine if there are any UEs, such as the UE 118, in the predetermined area undergoing vendor testing. Once the network device 112 determines that the UE 118 is undergoing vendor testing, the network device 112 may remove KPI values measured from the UE 118 and/or KPI values received from the UE 118 from the collected KPI data of the UEs that were measured. In some cases, the network device 112 may determine that the UE 118 is undergoing vendor device testing prior to performing any measurements and may refrain from collecting KPI values from the UE 118 after determining that the UE 118 is undergoing vendor device testing.

Examples of the UE 102 and/or the UE 118 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 102 and/or the UE 118 can include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

In some instances, the network device(s) 112 can be implemented as one or more communication servers to facilitate communications by and between the various devices in the environment 100. That is, the network device(s) 112 can represent any computing devices implementing various aspects of one or more of second, third, fourth, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 112 may implement GSM, UMTS, LTE/LTE, and/or NR Advanced telecommunications technologies. The network device(s) 112 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 102, the network device(s) 112, and/or the network(s) 114. In some embodiments, the network device(s) 112 may be operated by a service provider. While FIG. 1 illustrates the network device(s) 112, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 114 can include, but are not limited to networks including second-generation (2G), third-generation (3G), fourth-generation (4G), or fifth-generation (5G) cellular networks, such as NR (New Radio), LTE (Long Term Evolution), and data networks, such as Wi-Fi networks.

In some instances, the UE 102 and/or the UE 118 can communicate with any number of user equipment, servers, network devices, computing devices, and the like. Further, in some instances, the UE 102 and/or the UE 118 can send metric data to a network device (such as the network device(s) 112) for aggregation and processing.

In some instances, the UE 102 and/or the UE 118 can monitor the signal 108 without utilizing the frequency resources associated with the signal for communication(s). That is, the UE 102 and/or the UE 118 can communicate with other devices using a separate base station or wireless transceiver, not illustrated in FIG. 1.

Figure 2:
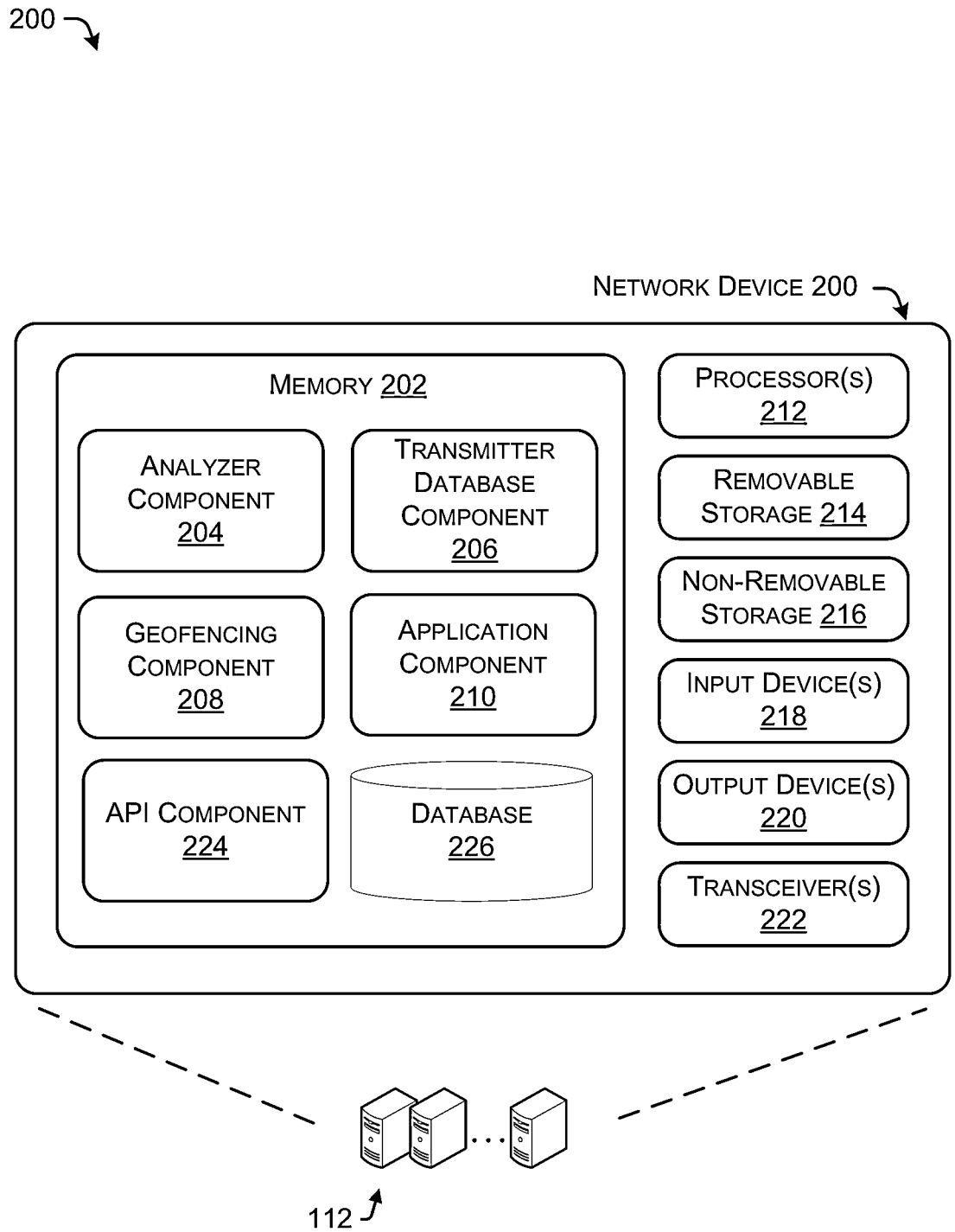
FIG. 2 illustrates an example network device configured to perform network measurements, in accordance with embodiments of the disclosure.

FIG. 2 illustrates an example network device 200 configured to receive UE identifying information from a vendor and network metrics (e.g., KPI data) associated with UEs, in accordance with embodiments of the disclosure. In some embodiments, the network device 200 can correspond to the network device(s) 112 of FIG. 1. It is to be understood in the context of this disclosure that the network device 200 can be implemented as a single device or as a plurality of devices with components and data distributed among them.

As illustrated, the network device 200 comprises a memory 202 storing an analyzer component 204, a transmitter database component 206, a geofencing component 208, an application component 210, an API component 224, and a database 226. Also, the network device 200 includes processor(s) 212, a removable storage 214 and non-removable storage 216, input device(s) 218, output device(s) 220, and transceiver(s) 222.

In various embodiments, the memory 202 is volatile (such as RAM), non-volatile (such as ROM, flash memory, etc.) or some combination of the two. The analyzer component 204, the transmitter database component 206, the geofencing component 208, and the enablement component 210 stored in the memory 202 can comprise methods, threads, processes, applications or any other sort of executable instructions. The analyzer component 204, the transmitter database component 206, the geofencing component 208, and the enablement component 210 can also include files and databases.

The analyzer component 204 can include functionality to receive one or more metrics determined and/or captured by user equipment, as discussed herein. In some instances, the analyzer component 204 can receive a plurality of metrics and store the metrics in a database. In some instances, the metrics can be indexed by location, time, user equipment, and the like. In some instances, the analyzer component 204 can perform any statistical analysis on the metrics to determine a variety of signal characteristics. For example, the analyzer component 204 can determine a signal type (e.g., TV, radio, cell phone, etc.) as well as quantitate or qualitative characteristics of the signal.

In some examples, the analyzer component 204 may measure KPIs for a particular UE type (e.g., make, model, brand, etc.) and/or a particular technology (e.g., software version, software update, etc.) and the analyzer component 204 may receive KPI data associated with a group of UEs undergoing testing. In some cases, prior to performing the measurement (e.g., prior to sending a request to the UEs for KPI data), the analyzer component 204 may reference the database 228 to determine that a UE is undergoing vendor testing by a vendor device and the analyzer component 204 may refrain from performing the measurement on the UE underdoing vendor testing while continuing to perform measurements on UEs that are not undergoing vendor testing.

In other cases, the analyzer component 204 may perform a measurement on all of the UEs to be tested within a given area (e.g., both UEs underdoing vendor testing and UEs that are not undergoing vendor testing) and receive KPI data for those devices. Once the KPI data is received, the analyzer component 204 may reference the database 228 and determine which UEs and/or technology are undergoing vendor testing and the analyzer component 204 may remove KPI data received from those UEs out of the collected KPI data received from the measured UEs. For example, the analyzer component 204 may receive KPI data from a UE that is not undergoing vendor testing and may also receive KPI data from a UE that is undergoing vendor testing. The analyzer component 204 may access the database 228 and determine that the UE undergoing vendor testing is being vendor tested based on identifying information stored in the database that identifies the UE and an indication in the database 228 that the UE is undergoing vendor testing (e.g., a testing schedule, a testing type, etc.). In response to determining that the UE is undergoing vendor testing, the analyzer component 204 may filter the KPI data received from the UE undergoing vendor testing out of the KPI data received from other UEs.

In some instances, the analyzer component 204 can correspond to the analyzer component 116 of FIG. 1.

The transmitter database component 206 can store locations of transmitters and/or base stations in a database. Further, the transmitter database component 206 can receive location data and/or metrics associated with a signal to determine which transmitter corresponds to the metrics (e.g., KPI data). In some instances, the transmitter database component 206 can determine a confidence value associated with the identity of a transmitter or base station.

The geofencing component 208 can include functionality to determine areas in which the measurements (e.g., KPI measurements) should be performed. For example, the geofencing component 208 can determine areas around a group of UEs where metrics are to be determined. In some instances, the geofencing component 208 can determine areas where signal characteristics are known such that the analysis is not needed. In some instances, the geofencing component 208 can send indications of the geofenced locations to one or more user equipment to collect metrics, as discussed herein.

The application component 210 can include functionality to communicate via one or more APIs, such as the API component 224. For example, in some cases the application component 210 may be used to enter data into the database 226, such as KPI data received from UEs or otherwise obtained from UEs. In some cases, the application component 210 may be used to communicate with the vendor device to receive information from the vendor device. For example, the application 210 may access the API component 224 and may receive vendor testing information (e.g., identifying information) associated with UEs the vendor device is performing tests on. For example, the vendor device may provide the network device 200 with device models, software versions, IMEIs, MSISDNs, phone numbers, type of testing (e.g., intensive drive tests), testing schedules, etc.

The API component 224 may include functionality to operate as an intermediary between applications, such as applications accessible by the network device, applications accessible by the vendor device, and/or other applications. In some cases, the API component 224 may define interactions between multiple software applications and/or mixed hardware-software intermediaries. In some examples, the API component 224 may define the types of calls and/or requests that can be made, how to make them, the data formats that should be used, the conventions to follow, etc. In some cases, the API component 224 may also provide extension mechanisms so that users can extend existing functionality in various ways and to varying degrees. For example, the API component 224 may include a webhook service may be built into the API component 224 such that when the network device 200 stores performance KPI values (e.g., dropped call rate above a threshold value) to the database 226, the webhook may trigger such that the information is transmitted to the vendor device. In some cases the API component 224 may be in the form of a JSON object such that a vendor device and/or the network device 200 can call HTTP POST and HTTP GET to send and receive data.

The database 226 may include identifying information for all of the network UEs, such as the UE 102, provided to the consumers undergoing testing as well as identifying information of the vendor UEs, such as the UE 118, received from the vendor device undergoing vendor testing. In some cases, the database 226 is accessible by the vendor device via an API and the vendor device can receive and send information, for example, via an HTTP POST or HTTP GET. In some cases, the vendor testing information may provide identifying information associated with UEs undergoing vendor testing, testing type information associated with the UEs undergoing vendor testing, and/or a testing schedule associated with the UEs undergoing vendor testing.

In some embodiments, the processor(s) 212 is a central processing unit (CPU), a graphics processing unit (GPU), or both CPU and GPU, or other processing unit or component known in the art.

The network device 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and nonvolatile, removable and non-removable media implemented in any method or technology for storage of information, such as computer readable instructions, data structures, program modules, or other data. Memory 202, removable storage 214 and non-removable storage 216 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network device 200. Any such tangible computer-readable media can be part of the network device 200.

The network device 200 can include input device(s) 218, such as a keypad, a cursor control, a touch-sensitive display, etc. Also, the network device 200 can include output device(s) 220, such as a display, speakers, etc. These devices are well known in the art and need not be discussed at length here.

As illustrated in FIG. 2, the network device 200 can include one or more wired or wireless transceiver(s) 222. In some wireless embodiments, to increase throughput, the transceiver(s) 222 can utilize multiple-input/multiple-output (MIMO) technology. The transceiver(s) 222 can be any sort of wireless transceivers capable of engaging in wireless, radio frequency (RF) communication. The transceiver(s) 222 can also include other wireless modems, such as a modem for engaging in Wi-Fi, WiMax, Bluetooth, infrared communication, or the like.

Figure 3:
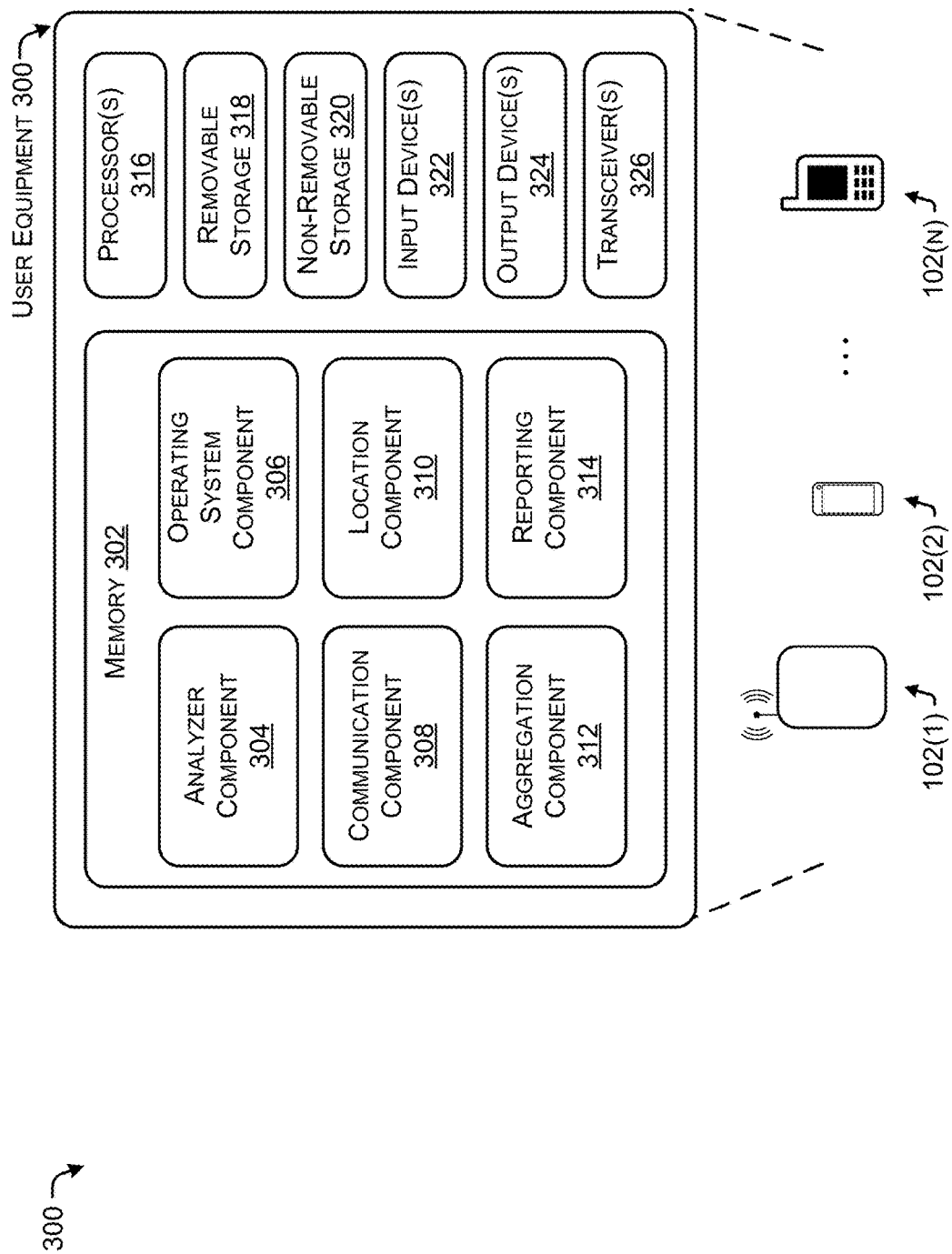
FIG. 3 illustrates an example user equipment configured to perform network metric measurements, in accordance with embodiments of the disclosure.

FIG. 3 illustrates an example user equipment 300 configured to implement an analyzer, such as for measuring KPI values, in accordance with embodiments of the disclosure. In some embodiments, the user equipment 300 can correspond to the UE 102 and/or the UE 118 of FIG. 1. It is to be understood in the context of this disclosure that the user equipment 300 can be implemented as a single device or as a plurality of devices with components and data distributed among them. By way of example, and without limitation, the user equipment 300 can be implemented as various UE 102(1), 102(2), . . . , 102(N).

As illustrated, the user equipment 300 comprises a memory 302 storing an analyzer component 304, an operating system component 306, a communication component 308, a location component 310, a aggregation component 312, and a reporting component 314. Also, the user equipment 300 may include processor(s) 316, a removable storage 318 and non-removable storage 230, input device(s) 322, output device(s) 324, and transceiver(s) 326.

In various embodiments, memory 302 is volatile (such as RAM), non-volatile (such as ROM, flash memory, etc.) or some combination of the two. The analyzer component 304, the operating system component 306, the communication component 308, the location component 310, the aggregation component 312, and the reporting component 314 stored in the memory 302 can comprise methods, threads, processes, applications or any other sort of executable instructions. The spectrum component 304, the operating system component 306, the communication component 308, the location component 310, the aggregation component 312, and the reporting component 314 can also include files and databases.

In some instances, the analyzer component 304 can correspond to the analyzer component 104 of FIG. 1. The analyzer component 304 can include functionality to determine one or more metrics associated with a signal received, detected, or otherwise monitored by the user equipment 300. For example, the analyzer component 304 can determine metrics including but not limited to KPI values, RSSI, RSRP, RSRQ, SINR, power density and the like for a specific bandwidth in the frequency domain. In some instances, information can be associated with the metrics, such as a band number, channel number, block identifier, and the like. In some instances, the analyzer component 304 can scan a frequency resource at any regular or irregular interval, or can initiate a scan based on an internal or external trigger or command. For example, the analyzer component 304 can receive an instruction from a remote network device to initiate a scan. In some instances, the analyzer component can determine operating conditions or characteristics of the user equipment 300 (e.g., a power resource, location, etc.), and a command to initiate scanning can be based at least in part on those operating conditions or characteristics. In some instances, the spectrum component 304 can include previously-collected measurements. In some instances, the analyzer component 304 can sample conditions of a signal over a period of time and perform a statistical analysis to determine additional metrics (e.g., average, median, high, low, etc.) associated with the signal.

The operating system component 306 can include functionality to query a chipset of the user equipment 300, and/or to query the transceiver(s) 326, to instruct the transceiver(s) 326 and/or any software or hardware to scan one or more channels or frequency resources to determine metrics associated with the channel or frequency resources, for example.

The communication component 308 can include functionality to conduct communications with one or more other devices, as discussed herein. In some instances, the communication component 308 can conduct a communication via a first set of frequency resources, while the analyzer component 304 can analyze a second set of frequency resources.

The location component 310 can include functionality to determine a location of the user equipment 300. In some instances, the location component 310 can determine a location based at least in part on GPS location data, base station identity, Wi-Fi access point identity, or a combination of location sources. In some embodiments, a location can include a mobile network code (MNC) and a mobile country code (MCC) used in combination to uniquely identify a mobile network carrier network. In some embodiments, the location component 310 can determine a base station or cell identity, and/or latitude, longitude, altitude information, and timestamp information. In some instances, the location can be determined in connection with determining one or more metrics associated with a signal or channel. In some instances, the location can be provided to a network device, for example, for aggregation and analysis. In some instances, the location component 310 can determine a location of the user equipment 300 relative to a location of a geofenced location. For example, the location component 310 can receive a geofenced location from a network device.

The aggregation component 312 may include functionality to aggregate signal strength information associated with the user equipment 300, including one or more of the metrics discussed with respect to FIG. 1. For example, the analyzer component may evaluate KPI values, RSSI, RSRP, MCC, MNC, network type information, location information received from the location component 310, time and/or date information, etc., and save the metrics to the removable storage 318 and/or the non-removable storage 230. As discussed hereafter, one or more triggering events may cause the user equipment 300 to transmit the measured data by retrieving the metrics from the removable storage 318 and/or the non-removable storage 230, and transmitting the signal strength information via the transceiver(s) 326 to the network device(s) 112.

The reporting component 314 can include functionality to store one or more metrics associated with one or more frequency resources and to send such metrics to a network device. In some instances, the reporting component 314 can send the one or more metrics to a network device as the one or more metrics are generated, captured, or determined. In some instances, the reporting component 314 can send the metrics to the network device. In some instances, the reporting component 314 can send the metrics based on a connection type of the user equipment 300 (e.g., when the user equipment 300 is connected to a Wi-Fi network). In some instances, the reporting component 314 can send the metrics at a time of low network congestion (e.g., at night). In some instances, the reporting component 314 can transmit metrics in response to a query from a network device, for example. In some instances, the reporting component 314 can encode the data sent to a network device such that a service provider tracking data usage does not count the data against a quota associated with the user equipment 300.

In some embodiments, the processor(s) 316 is a central processing unit (CPU), a graphics processing unit (GPU), or both CPU and GPU, or other processing unit or component known in the art.

The user equipment 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and non-volatile, removable and non-removable media implemented in any method or technology for storage of information, such as computer readable instructions, data structures, program modules, or other data. Memory 302, removable storage 318 and non-removable storage 320 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 300. Any such tangible computer-readable media can be part of the user equipment 300.

In various embodiments, the user equipment 300 can include applications including but are not limited, a web browser application, a video streaming application, an online gaming application, a spectrum analyzer, and the like. During execution on the user equipment 300, each of the applications may be configured to cause the user equipment 300 to initiate data communications with the network device(s) 112 over the network(s) 114.

The user equipment 300 may be configured to communicate over a telecommunications network using any common wireless and/or wired network access technology. Moreover, the UE 102 may be configured to run any compatible device operating system (OS), including but not limited to, Microsoft Windows Mobile, Google Android, Apple iOS, Linux Mobile, as well as any other common mobile device OS.

The user equipment 300 also can include input device(s) 322, such as a keypad, a cursor control, a touch-sensitive display, voice input device, etc., and output device(s) 324 such as a display, speakers, printers, etc. These devices are well known in the art and need not be discussed at length here.

As illustrated in FIG. 3, the user equipment 300 also includes one or more wired or wireless transceiver(s) 326. For example, the transceiver(s) 326 can include a network interface card (NIC), a network adapter, a LAN adapter, or a physical, virtual, or logical address to connect to various network(s) 114, or to the network device(s) 112, for example. To increase throughput when exchanging wireless data, the transceiver(s) 326 can utilize multiple-input/multiple-output (MIMO) technology. The transceiver(s) 326 can comprise any sort of wireless transceivers capable of engaging in wireless, radio frequency (RF) communication. The transceiver(s) 326 can also include other wireless modems, such as a modem for engaging in Wi-Fi, WiMax, Bluetooth, infrared communication, and the like.

In some instances, the transceiver(s) 326 can correspond to the transceiver(s) 106 of FIG. 1.

Figure 4:
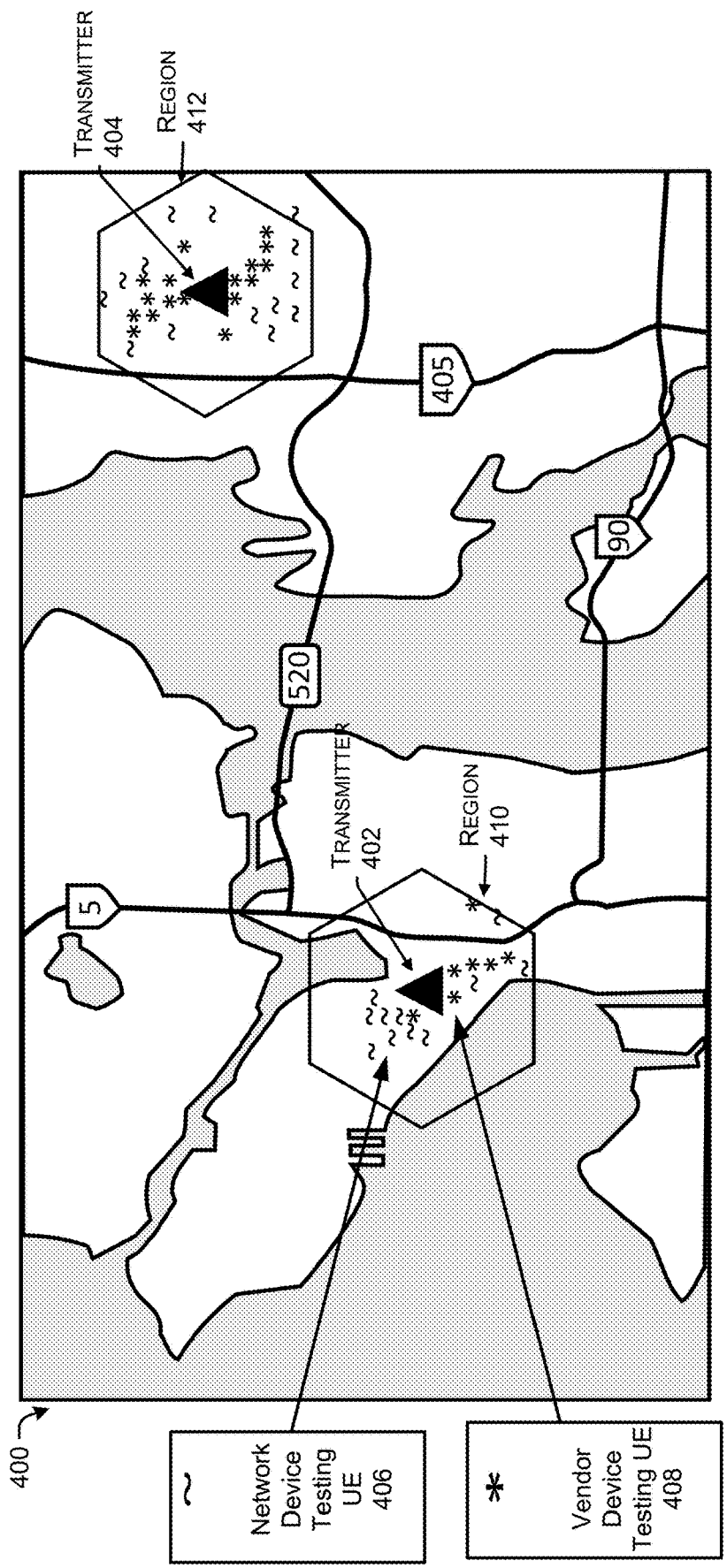
FIG. 4 illustrates an example visualization of data, in accordance with embodiments of the present disclosure.

FIG. 4 illustrates an example visualization of data including data captured using a network device, as discussed herein. In some instances, the example visualization can be represented as a map 400.

In some instances, the map 400 can represent various transmitters 402 and 404 in an environment. Further, the map 400 can represent network device testing UEs 406 represented on the map by a "~" and vendor device testing UEs 408 represented on the map by a "*". The network device testing UEs 406 may correspond to the UE 102 and the vendor device testing UEs 408 may correspond to the UE 118, as described above with respect to FIG. 1. In some examples, the network device 112 may perform KPI value measurements for UEs within a predetermined area, such as region 410 and/or region 412. In some cases, the network device 112 may access the database 132 to determine if the region 410 and/or the region 412 corresponds to location data and/or identifying information received from the vendor device 120 and determine if there are any vendor device testing UEs 408 in the regions 410 and/or the regions 412 undergoing vendor testing. Once the network device 112 identifies the vendor device testing UEs 408, the network device 112 may remove KPI values measured from the vendor device testing UEs 408 and/or KPI values received from the vendor device testing UEs 408 from the collected KPI data of the UEs measured in the region 410 and/or the region 412. In some cases, the network device 112 may determine that the vendor device testing UEs 408 are undergoing vendor device testing prior to performing any measurements and may refrain from collecting KPI values from the vendor device testing UEs 408 after determining that the vendor device testing UEs 408 are located in the region 410 and/or the region 412.

Figure 5:
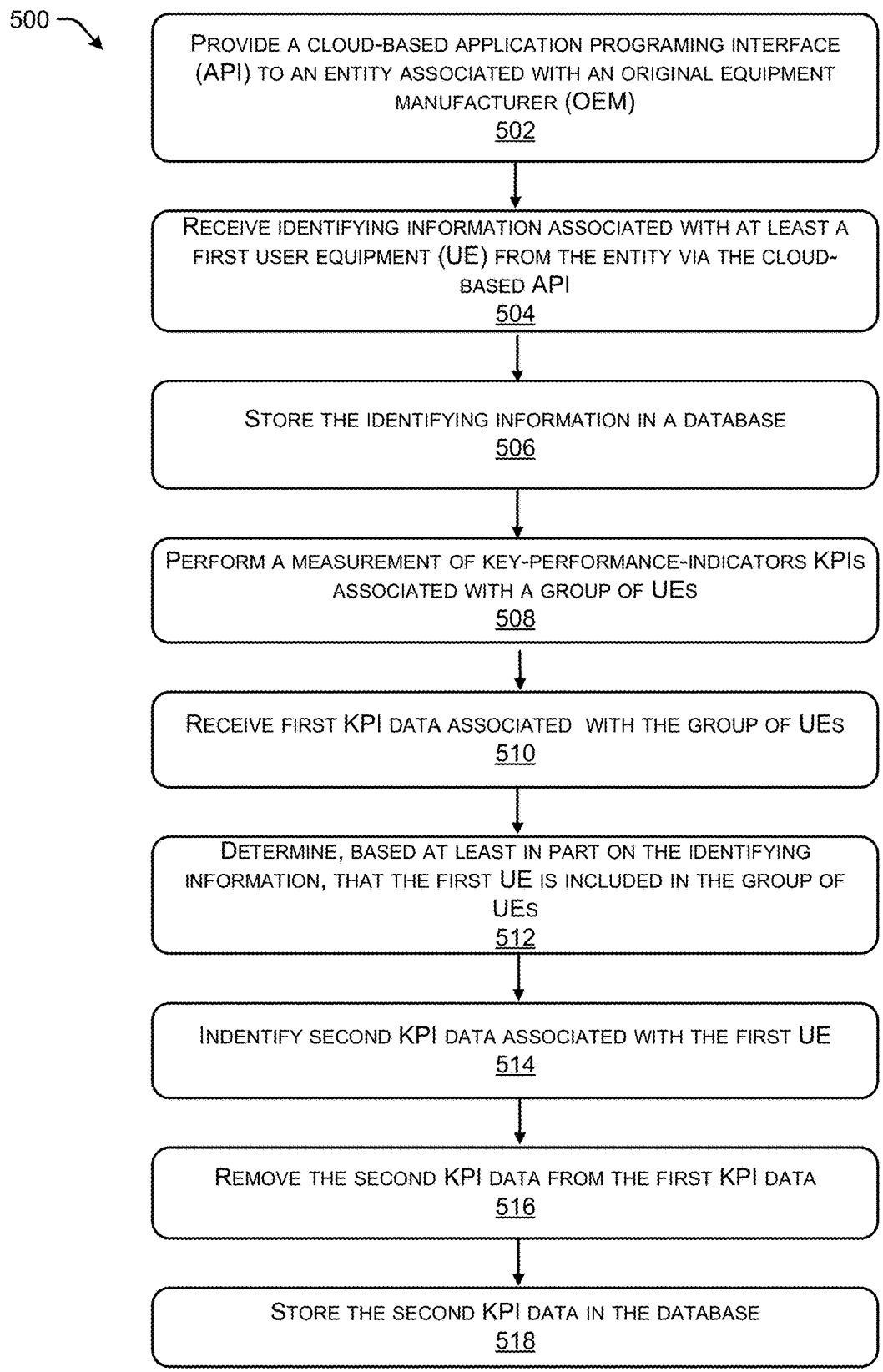
FIG. 5 illustrates an example process in accordance with embodiments of the present disclosure.
Figure 6:
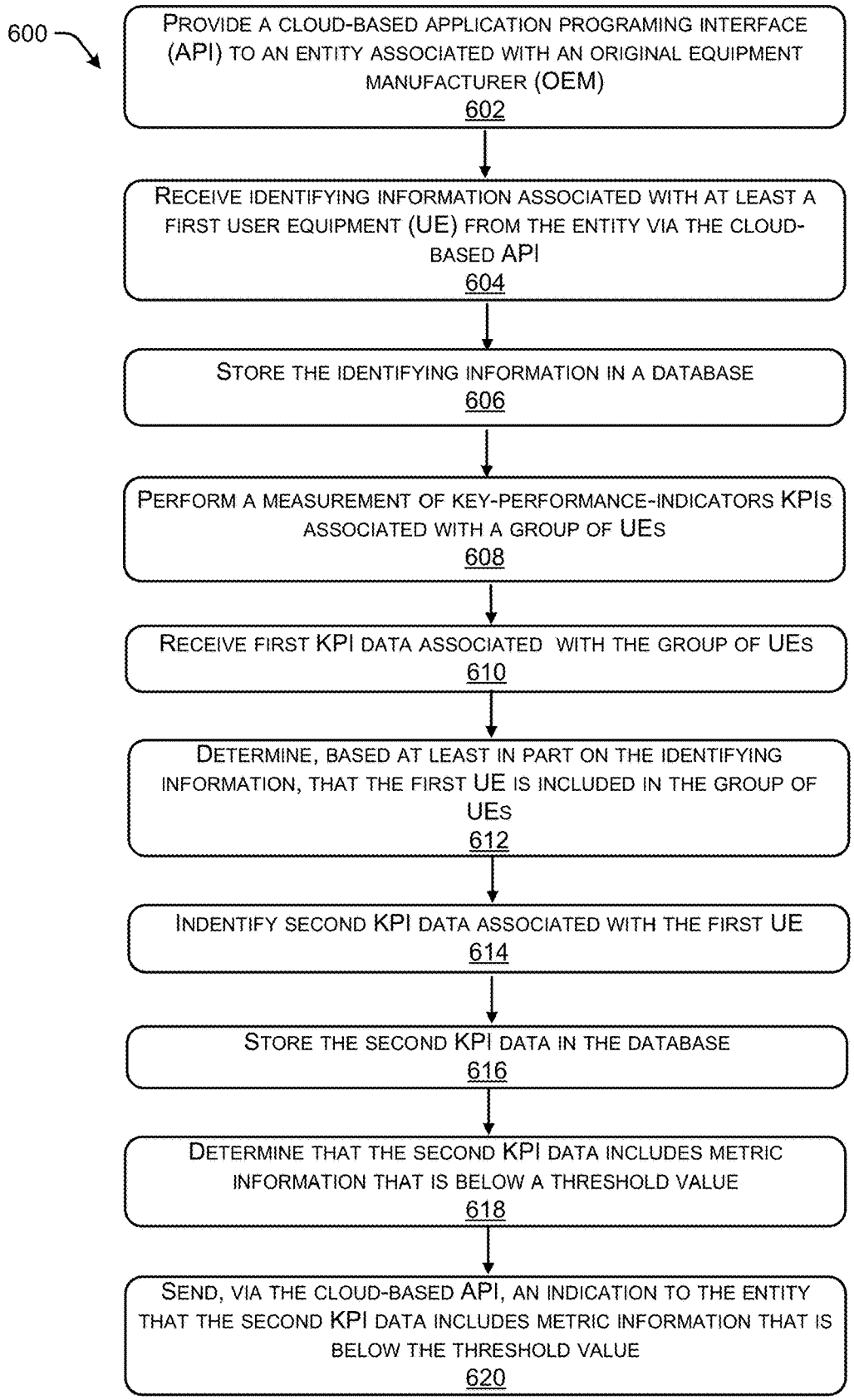
FIG. 6 illustrates an example process in accordance with embodiments of the present disclosure.

FIGS. 5 and 6 illustrate example processes in accordance with embodiments of the disclosure. This processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

At operation 502, the network device may provide a cloud-based application programing interface (API) to an entity associated with an original equipment manufacturer (OEM). For example, the API 124 may be in the form of a JSON object such that the vendor device 120 can call HTTP POST and HTTP GET to send and receive data to and from the network device 112. In some cases, the vendor device 120 and the network device 112 may communicate via the API 124 using an application 126 stored on the vendor device 120 and an application 128 stored on the network device 112.

At operation 504, the network device may receive identifying information associated with at least a first user equipment (UE) from the entity via the cloud-based API. In some cases, the network device 112 may receive vendor testing information (e.g., identifying information) associated with the UE 118 that the vendor device 120 is performing tests on. For example, the vendor device 120 may provide the network device 112, via the API 124, with device models, software versions, IMEIs, MSISDNs, phone numbers, type of testing (e.g., intensive drive tests), testing schedules, etc. In some examples, the vendor device 120 may store the identifying information in a database 130 and the application 126 may access the database 130 to send and receive data to and from the database 130 of the vendor device 120.

At operation 506, the network device may store the identifying information in a database. For example, the network device 112 may store the database 132 containing identifying information for all of the network UEs, such as the UE 102, provided to the consumers undergoing testing as well as identifying information of the vendor UEs, such as the UE 118, received from the vendor device 120 undergoing vendor testing. In some cases, the database 132 is accessible by the vendor device 120 via the API 124 and the vendor device 120 can receive and send information, for example, via an HTTP POST or HTTP GET. In some cases, the vendor testing information may provide identifying information associated with the UE 118, testing type information associated with the UE 118, and/or a testing schedule associated with the UE 118.

At operation 508, the network device perform a measurement of key-performance-indicators KPIs associated with a group of UEs. For example, the network device 112 may perform a measurement, via the analyzer component 116, of KPIs for a particular UE type (e.g., make, model, brand, etc.) and/or a particular technology (e.g., software version, software update, etc.) and the network device 112 may receive first KPI data associated with a group of UEs undergoing testing.

At operation 510, the network device may receive first KPI data associated with the group of UEs. For example, the first KPI data may be received from UEs within a predefined area, UEs of a determined type, UEs operating a particular type of software, etc.

At operation 512, the network device may determine, based at least in part on the identifying information, that the first UE is included in the group of UEs. For example, the network device 112 may determine that the identifying information received from the UE 118 is stored in the database 132 and indicated to be a UE undergoing vendor testing. In some cases, the network device 112 may access the database 132 to determine if the predetermined area corresponds to location data received from the vendor device 120 and determine if there are any UEs, such as the UE 118, in the predetermined area undergoing vendor testing.

At operation 514, the network device may identify second KPI data associated with the first UE. For example, the network device may determine that KPI data received from the group of UEs that were measured includes KPI values from the first UE.

At operation 516, the network device may remove the second KPI data from the first KPI data. For example, once the network device 112 determines that the UE 118 is undergoing vendor testing, the network device 112 may remove KPI values measured from the UE 118 and/or KPI values received from the UE 118 from the collected KPI data of the UEs that were measured. In some cases, the network device 112 may determine that the UE 118 is undergoing vendor device testing prior to performing any measurements and may refrain from collecting KPI values from the UE 118 after determining that the UE 118 is undergoing vendor device testing.

At operation 518, the network device may store the second KPI data in the database. For example, the second KPI data may represent the collected KPI values of all of the measured UEs with the KPI values of the UEs having been determined to have been undergoing vendor testing removed.

FIG. 6 illustrates another example process in accordance with embodiments of the disclosure.

At operation 602, the network device may provide a cloud-based application programing interface (API) to an entity associated with an original equipment manufacturer (OEM). For example, the API 124 may be in the form of a JSON object such that the vendor device 120 can call HTTP POST and HTTP GET to send and receive data to and from the network device 112. In some cases, the vendor device 120 and the network device 112 may communicate via the API 124 using an application 126 stored on the vendor device 120 and an application 128 stored on the network device 112.

At operation 604, the network device may receive identifying information associated with at least a first user equipment (UE) from the entity via the cloud-based API. For example, the vendor device 120 may provide the network device 112, via the API 124, with device models, software versions, IMEIs, MSISDNs, phone numbers, type of testing (e.g., intensive drive tests), testing schedules, etc. In some examples, the vendor device 120 may store the identifying information in a database 130 and the application 126 may access the database 130 to send and receive data to and from the database 130 of the vendor device 120.

At operation 606, the network device may store the identifying information in a database. For example, the network device 112 may store the database 132 containing identifying information for all of the network UEs, such as the UE 102, provided to the consumers undergoing testing as well as identifying information of the vendor UEs, such as the UE 118, received from the vendor device 120 undergoing vendor testing. In some cases, the database 132 is accessible by the vendor device 120 via the API 124 and the vendor device 120 can receive and send information, for example, via an HTTP POST or HTTP GET. In some cases, the vendor testing information may provide identifying information associated with the UE 118, testing type information associated with the UE 118, and/or a testing schedule associated with the UE 118.

At operation 608, the network device perform a measurement of key-performance-indicators KPIs associated with a group of UEs. For example, the network device 112 may perform a measurement, via the analyzer component 116, of KPIs for a particular UE type (e.g., make, model, brand, etc.) and/or a particular technology (e.g., software version, software update, etc.) and the network device 112 may receive first KPI data associated with a group of UEs undergoing testing.

At operation 610, the network device may receive first KPI data associated with the group of UEs. For example, the first KPI data may be received from UEs within a predefined area, UEs of a determined type, UEs operating a particular type of software, etc.

At operation 612, the network device may determine, based at least in part on the identifying information, that the first UE is included in the group of UEs. For example, the network device 112 may determine that the identifying information received from the UE 118 is stored in the database 132 and indicated to be a UE undergoing vendor testing. In some cases, the network device 112 may access the database 132 to determine if the predetermined area corresponds to location data received from the vendor device 120 and determine if there are any UEs, such as the UE 118, in the predetermined area undergoing vendor testing.

At operation 614, the network device may identify second KPI data associated with the first UE. For example, the network device may determine that KPI data received from the group of UEs that were measured includes KPI values from the first UE.

At operation 616, the network device may store the second KPI data in the database. For example, the second KPI data may be stored in the database 132.

At operation 618, the network device may determine that the second KPI data includes metric information that is below a threshold value. For example, the network device 112 perform KPI measurements on the UE 102 and in some cases may determine that one or more of the measured KPIs falls below and/or above a threshold. For example, the network device 112 may determine that a drop call rate associated with the UE 102 is above a threshold and/or a difference between the drop call rate of the UE 102 compared to a determined average may be above a threshold.

At operation 620, the network device may send, via the cloud-based API, an indication to the entity that the second KPI data includes metric information that is below the threshold value. For example, the network device 112 may store the measured KPI value in the database 132 and the vendor device 120 may be automatically informed of the KPI value being below and/or above the threshold value. For example, a webhook service may be built into the API 124 and/or the database 132 such that when the network device 112 stores performance KPI values (e.g., drop call rate above a threshold value) to the database 132, the webhook may trigger such that the information is transmitted to the vendor device 120. In this way, the vendor associated with the vendor device 120 may be informed that a UE that they manufactured and provided to the network provider associated with the network device 112 is performing inadequately.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A processor-implemented method comprising:
providing a cloud-based application programing interface (API) to an entity associated with an original equipment manufacturer (OEM);
receiving identifying information associated with at least a first user equipment (UE) from the entity via the cloud-based API;
storing the identifying information in a database;
performing a measurement of key-performance-indicators (KPIs) associated with a group of UEs;
receiving first KPI data associated with the group of UEs;
determining, based at least in part on the identifying information, that the first UE is included in the group of UEs;
identifying second KPI data associated with the first UE;
removing the second KPI data from the first KPI data;
storing the second KPI data in the database;
determining third KPI data associated with a second UE of the group of UEs;
determining that the third KPI data includes metric information that is below a threshold value; and
sending, via the cloud-based API, an indication to the OEM that the third KPI data includes metric information that is below the threshold value, wherein the second UE is associated with the OEM.

2. The processor-implemented method of claim 1, wherein the identifying information includes at least one of a device model, a software version, an International Mobile Equipment Identity (IMEI), a Mobile Station International Subscriber Directory Number (MSISDN), a phone number, a type of testing, or a testing schedule.

3. The processor-implemented method of claim 1, further comprising receiving an indication from the OEM that the first UE is undergoing a stress-test by the OEM and/or that the first UE is undergoing a software test by the OEM.

4. The processor-implemented method of claim 1, wherein the cloud-based API is in the form of a JSON object and receiving the identifying information associated with the first UE is via an HTTP POST.

5. The processor-implemented method of claim 1, wherein the first KPI data includes at least one of a call drop rate, a network access failure rate, data throughput, latency, or voice quality.

6. The processor-implemented method of claim 1, wherein the group of UEs are associated with a pre-launch technology undergoing testing from a network provider.

7. The processor-implemented method of claim 1, further comprising
storing the third KPI data in the database, wherein storing the third KPI data causes a webhook to send an indication to the OEM that the third KPI data includes metric information that is below the threshold value in response to the metric information being below the threshold value.

8. A processor-implemented method comprising:
providing a cloud-based application programing interface (API) to an entity associated with an original equipment manufacturer (OEM);
receiving identifying information associated with at least a first user equipment (UE) from the entity via the cloud-based API;
storing the identifying information in a database;
performing a measurement of key-performance-indicators (KPIs) associated with a group of UEs;
receiving first KPI data associated with the group of UEs;
determining, based at least in part on the identifying information, that the first UE is included in the group of UEs;
identifying second KPI data associated with the first UE;
storing the second KPI data in the database;

determining third KPI data associated with a second UE of the group of UEs;

determining that the third KPI data includes metric information that is below a threshold value; and sending, via the cloud-based API, an indication to the entity associated with the OEM that the third KPI data includes metric information that is below the threshold value, wherein the second UE is associated with the OEM.

9. The processor-implemented method of claim 8, wherein storing the second KPI data in the database causes a webhook embedded in the cloud-based API to send the indication to the OEM.

10. The processor-implemented method of claim 8, wherein the identifying information includes at least one of a device model, a software version, an International Mobile Equipment Identity (IMEI), a Mobile Station International Subscriber Directory Number (MSISDN), a phone number, a type of testing, or a testing schedule.

11. The processor-implemented method of claim 8, wherein the group of UEs are associated with a pre-launch technology undergoing testing from a network provider.

12. The processor-implemented method of claim 8, further comprising receiving an indication from the OEM that the first UE is undergoing a stress-test by the OEM and/or that the first UE is undergoing a software test by the OEM.

13. The processor-implemented method of claim 8, wherein the cloud-based API is in the form of a JSON object and receiving the identifying information associated with the first UE is via an HTTP POST.

14. The processor-implemented method of claim 8, wherein the first KPI data includes at least one of a call drop rate, a network access failure rate, data throughput, latency, or voice quality.

15. A system comprising:
one or more processors; and
one or more computer-readable media storing instructions executable by the one or more processors, wherein the instructions, when executed, cause the system to perform operations comprising:
providing a cloud-based application programing interface (API) to an entity associated with an original equipment manufacturer (OEM);
receiving identifying information associated with at least a first user equipment (UE) from the entity via the cloud-based API;
storing the identifying information in a database;
performing a measurement of key-performance-indicators (KPIs) associated with a group of UEs;
receiving first KPI data associated with the group of UEs;
determining, based at least in part on the identifying information, that the first UE is included in the group of UEs;
identifying second KPI data associated with the first UE;
removing the second KPI data from the first KPI data;
storing the second KPI data in the database;
determining third KPI data associated with a second UE of the group of UEs;
determining that the third KPI data includes metric information that is below a threshold value; and
storing the third KPI data in the database, wherein storing the third KPI data causes a webhook to send an indication to the OEM that the third KPI data includes metric information that is below the threshold value in response to the metric information being below the threshold value.

16. The system of claim 15, wherein the identifying information includes at least one of a device model, a software version, an International Mobile Equipment Identity (IMEI), a Mobile Station International Subscriber Directory Number (MSISDN), a phone number, a type of testing, or a testing schedule.

17. The system of claim 15, further comprising receiving an indication from the OEM that the first UE is undergoing a stress-test by the OEM and/or that the first UE is undergoing a software test by the OEM.

18. The system of claim 15, wherein the cloud-based API is in the form of a JSON object and receiving the identifying information associated with the first UE is via an HTTP POST.

19. The system of claim 15, wherein the first KPI data includes at least one of a call drop rate, a network access failure rate, data throughput, latency, or voice quality.

20. The system of claim 15, wherein the second UE is associated with the OEM.

* * * * *